United States Patent [19]
Fjermestad et al.

[11] 3,776,189
[45] Dec. 4, 1973

[54] AUTOMATIC MILKING APPARATUS

[75] Inventors: Arnold R. Fjermestad, Albert Lea; William M. Nellis, St. Paul, both of Minn.

[73] Assignee: National Cooperatives, Inc., Albert Lea, Minn.

[22] Filed: Apr. 17, 1972

[21] Appl. No.: 244,741

Related U.S. Application Data

[63] Continuation-in-part of Ser. No. 219,384, Jan. 20, 1972, abandoned.

[52] U.S. Cl. ............................................ 119/14.28
[51] Int. Cl. ............................................ A01j 05/04
[58] Field of Search ........................ 119/14.28, 14.14

[56] References Cited
UNITED STATES PATENTS
3,117,553   1/1964   Dujardin et al.................. 119/14.28
3,172,391   3/1965   Norton............................. 119/14.28

Primary Examiner—Hugh R. Chamblee
Attorney—Everett J. Schroeder, Joseph E. Ryan, Kenneth D. Siegried and Robert O. Vidas

[57]  ABSTRACT

A milking apparatus in which vacuum air pressure is applied to the milker units in a cyclically controlled sequence with a controlled time on and time off to provide an improved milking operation which requires only a single moving part in the form of the armature of the valve controlled by an electromagnet, the latter being controlled by a timing circuit completely of the solid state type.

12 Claims, 5 Drawing Figures

AUTOMATIC MILKING APPARATUS

The present application is a continuation-in-part of our co-pending application Ser. No. 219,384, filed Jan. 20, 1972 on AUTOMATIC MILKING APPARATUS, now abandoned.

Our invention relates to automatic milking apparatus and more particularly to an improved automatic milking apparatus utilizing an improved electronic pulsating control for the milkers.

Automatic milking apparatus has previously employed milking units in which vacuum air pressure is supplied to teat cups to draw milk from the udders of cows with the application of the vacuum pressure being controlled by means of mechanical and electromechanical switching apparatus. Such controls present a maintenance problem from the standpoint of wear and are not sufficiently rugged to withstand all atmospheric conditions such as found in farm sites and milking sheds.

The present invention is directed to an improved milking apparatus in which the control for the same is a solid state device providing only one moving part in the form of the electromagnets for the valves controlling the application of vacuum pressure to the milking units. Thus the improved milking apparatus is not subject to breakdown and may be utilized continuously with adjustability in the timing sequence and accuracy in the same to provide for extreme reliability in the milking apparatus. The solid state electronic pulsating unit provides for a significantly longer life in that it involves no moving parts and no tubes to burn out. In addition, the improved milking apparatus includes an automatic electronic circuit breaker connected between the rectifying power source and the DC coils of the electromagnets and responsive to current flow therethrough to selectively disconnect the electromagnets from the rectifier source under the presence of overcurrent conditions and to automatically reconnect the same when the overcurrent condition no longer exists.

It is therefore the principal object of this invention to provide an improved automatic milking apparatus.

Another object of this invention is to provide in an automatic milking apparatus, a solid state transistorized control for the same.

A further object of this invention is to provide in an automatic milking apparatus an improved electronic circuit breaker positioned in the solid state transistorized control and adapted to disconnect the coils of the milking apparatus from the energizing source under overcurrent conditions and automatically reconnect the same upon cessation of the overcurrent condition.

A still further object of this invention is to provide an automatic milking apparatus which is extremely reliable, rugged in operation for all atmospheric usage conditions and requiring a minimum of moving parts to eliminate wear for the same.

These and other objects of this invention will become apparent from a reading of the attached description together with the drawings wherein:

FIG. 5 is a portion of a schematic circuit diagram showing a modification to the circuit of FIG. 3 with the inclusion of an automatic electric circuit breaker therein.

Figure 2:
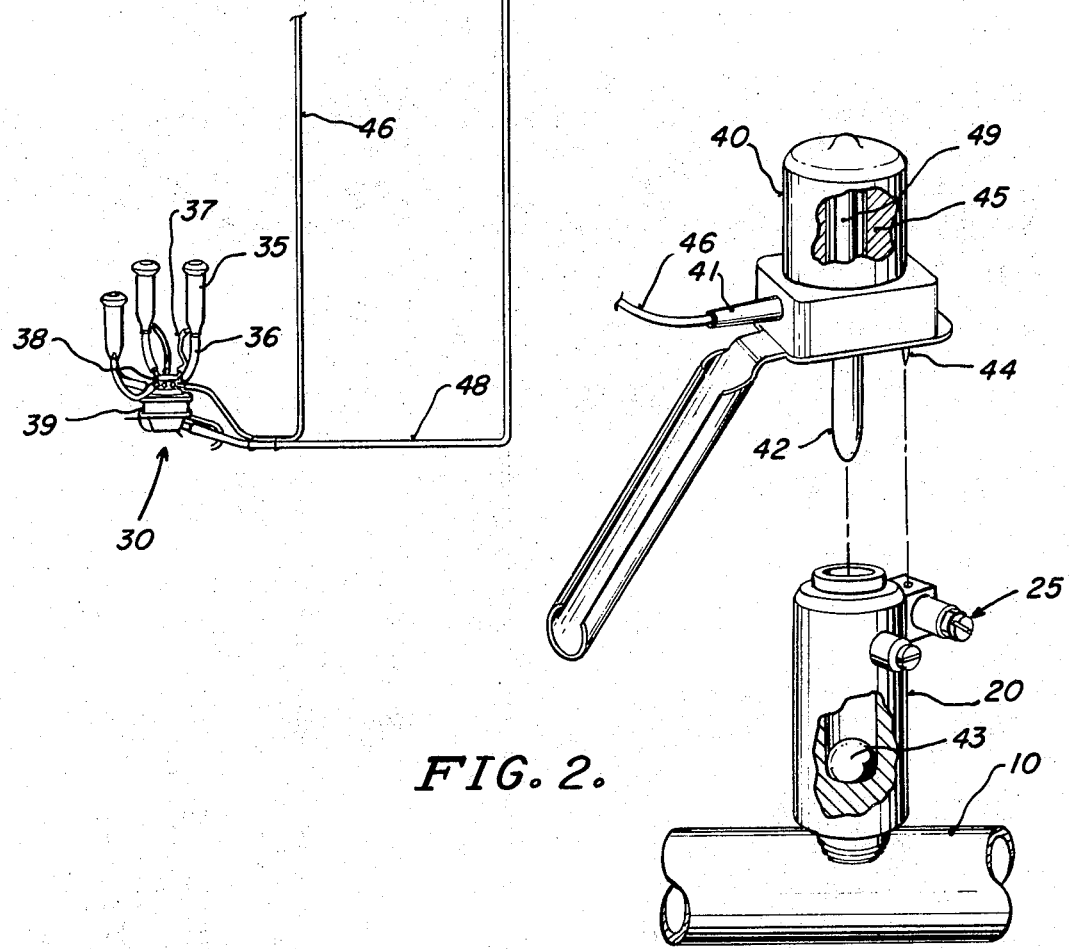
FIG. 2 is an elevation view of the pulsator portion of the milking apparatus with parts broken away.

Our improved milking apparatus or system employs a vacuum pipeline 10 and a milk pipeline 12 adapted to be distributed around a milking parlor or house with a plurality of stalls therein each stall having a stall cock 20 by means of which a milker unit 30 may be selectively connected to the same. The stall cock is normally mounted on the vacuum line 10 and includes an internal check valve adapted to be operated to an open position with the mounting of a pulsator 40 thereon. The stall cock includes an electrical connection as indicated at 25 with each of the stall cocks having the electrical connections connected in parallel and to a control apparatus 50 adapted to provide the electrical pulses to an internal electromagnet 45 incorporated in the pulsators. As will be seen in FIG. 2, the pulsator 40 when mounted on the stall cocks has a tubular extremity 42 of the same positioned within the stall cock to offset the internal check valve in the stall cock with the electrical connection pin 44 being connected to the electrical circuit 25 of the stall cock. The vacuum line 46 leads from the pulsator 40 to the milker unit 30 which has a plurality of teat cups 35 connected thereto by means of milk lines 36 and vacuum lines 37, the vacuum lines being connected to an air manifold connection 38 leading to the the vacuum line 46 connected to the pulsator. The milk lines 36 empty into the reservoir 39 of the milker unit with the output of the same leading through the milk line 48 therefrom to the common milk pipeline 12 in the parlor. The milker unit is conventional and vacuum pressure applied to the inflation (not shown) in the teat cups apply a pressure to the teats of the animal being milked causing the milk to be withdrawn into the teat cups and through the milk lines 36 into the reservoir or main cup 39 wherein it is removed by vacuum through the milk line 48 to the milk pipeline 12. The pulsator unit 40 incorporates an electromagnet having a coil 45 which is adapted to be energized from the electrical control circuit of the control 50 and with operation of the electromagnet a valve mechanism 49 positioned in the pulsator will permit airflow through the connecting pipe 42 from the vacuum line 10 through a ball check valve 43 in the stall cocks and through the outlet port 41 of the pulsator to the vacuum line 46 leading to the milker units. The milker unit and pulsator are for the most part conventional and the improved pulsator control for the same will be hereinafter described.

Figure 1:
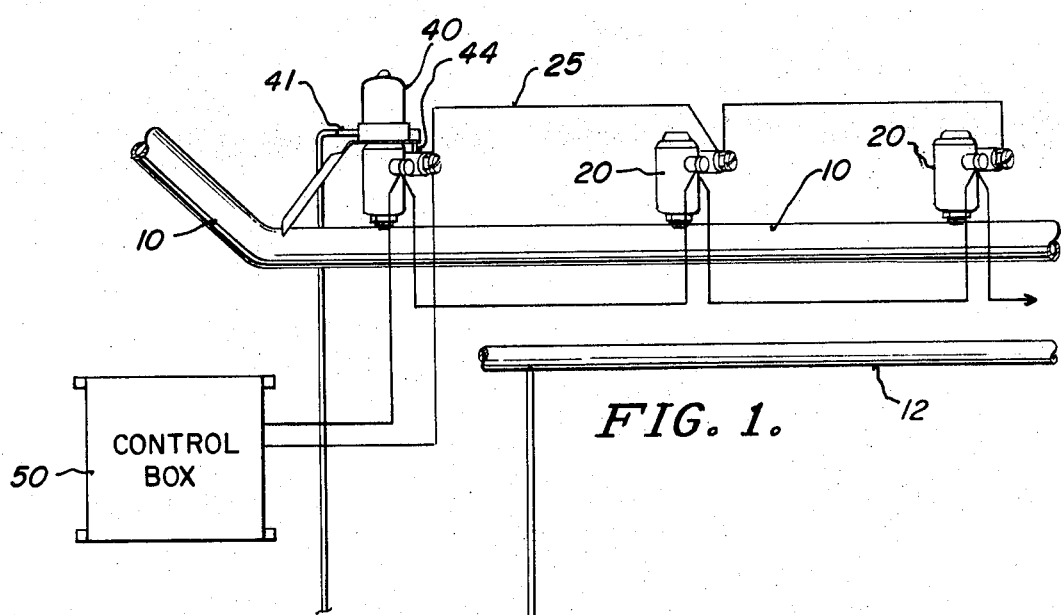
FIG. 1 is a schematic view of the milking apparatus embodying our invention.
Figure 3:
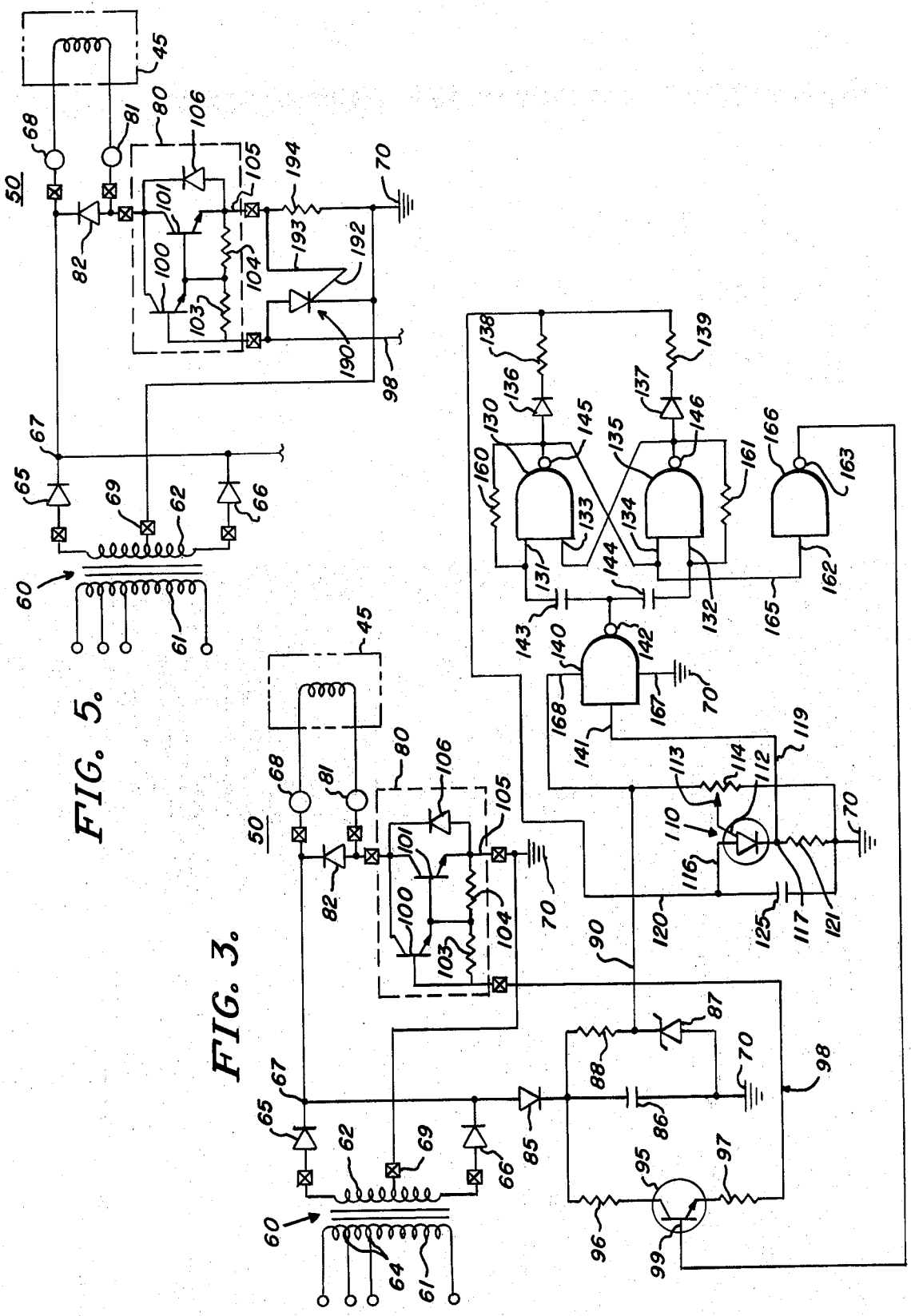
FIG. 3 is a schematic circuit diagram of one embodiment of the control for the improved milking apparatus.

As will be seen in FIG. 3, the control apparatus or circuit in a first embodiment, as indicated generally at 50 in FIG. 1, includes a step down transformer 60 having a primary winding 61 and a secondary winding 62 with the primary winding having a plurality of different voltage level taps 64 thereon to enable the control to be connected to an alternating current supply having slightly different alternating current voltages. Thus for example, the plurality of taps permit the control to be connected to 100, 110 or 120 volts AC 60 cycle supply current with a secondary winding having approximately 24 volts impressed thereon. The extremities of the secondary winding are connected through diodes 65, 66, respectively, with the opposite sides of the diode being connected in common, as at conductor 67, leading to a plus voltage terminal 68 adapted to be connected to the electromagnet coils or the bus conductor therefore. Secondary winding 62 of the transformer has a center tap 69 which is connected to ground 70 with an electronic switch, indicated generally at 80, being connected between the ground connection and a minus terminal 81 leading to the other side of the electromagnet bus adapted to be connected to the opposite side of the electromagnets 45. A diode 82 is connected between the terminals 68, 81 to counteract the inductive reaction generated in the coils when the energization is removed therefrom. The operation of the switch 80, as will be hereinafter identified, completes the circuit from the center tap of the secondary winding 62 of the transformer to the diodes 65, 66 or the extremities of the secondary winding to permit the 24 volt DC current to be applied to the electromagnets whenever the switch is closed or operative, and to remove the voltage from the electromagnets whenever the switch 80 is open.

The common connection between the diodes 65, 66 or the conductor 67 is connected through a diode 85 to a capacitor 86 leading to a ground connection 70 with a Zener diode 87 and a resistance element 88 connected in series and across the capacitor 86 between the diode 85 and the ground connection. The common tap between the Zener diode 87 and the resistor 86 at the conductor 90 provides a regulated DC voltage which will be applied to a timer circuit for the control as will be hereinafter identified. The electronic switch 80 is controlled by a transistor switch or transistor 95 whose collector electrode is connected through a resistor 96 to the unregulated portion of the DC supply or the one side of the capacitor 86 with the emitter electrode being connected through a resistor 97 and conductor 98 to the input of the switch 80 or Darlington amplifier to be hereinafter identified. The base electrode of the transistor 95, as indicated by the conductor 99 is connected to the output of the timer circuit. Thus whenever a voltage is impressed on the base of the transistor 95 through the conductor 99 from the timer, transistor 95 turns on energizing the switch 80 to complete the circuit from the diodes 65, 66 through the electromagnets to ground or the center tap 69 of the secondary winding 62. The switch 80 includes two transistors 100, 101 whose collector electrodes are connected in common and to the terminal 81 of the output circuit common to one side of the electromagnet bus for the electromagnets 45 with the emitter of the transistor 100 being connected to the base of the transistor 101. The base of transistor 100 is connected to the output conductor 98 of the transistor 95 and suitable load resistors 103, 104 are connected between the emitters of the respective transistors 100, 101 and the base electrodes for the same. The emitter electrode of the transistor 101 is connected to the ground connection 70 through a conductor 105 and a diode 106 is connected between the emitter and collector electrodes of the transistor 101 to prevent the inductive reaction of the electromagnet coils from damaging the transistor 101 when the switch is turned off. Thus the transistors 101 and 102 of the switch 80 will fire whenever the transistor 95 fires connecting the energizing circuit of the electromagnets or the plus electrode 67 to ground common to the center tap of the secondary winding 62 and completing the energization circuits for the electromagnets 45. This switch will be operated in a timed sequence in accord with the operation of the timer, to be hereinafter identified, which controls the energization and operation of the transistor 95 such that the electromagnets will be energized for a predetermined time period and off or de-energized for a predetermined time period with the timing continuing with energization and de-energization as long as power remains on the circuit. This will provide operation of the respective valves associated with the electromagnets to provide vacuum pressure to the milkers to provide a desired timed milking action.

The timer portion of the control circuit is controlled by a programmable unijunction transistor, indicated generally at 110. Its control electrode 112 is connected through a wiper 113 of a potentiometer 114 one extremity of which is connected to the regulated DC power conductor 90 and at the other extremity of which is connected to a ground terminal 70. The main electrodes 116, 117 of the unijunction transistor 110 are connected in parallel with a capacitor charging circuit. Thus an input conductor 120 from the charging circuit or circuits, to be hereinafter identified, is connected to a capacitor 125 with the circuit completed to the ground connection 70. Electrode 116 of the unijunction transistor is connected to one side of capacitor 125 and electrode 117 is connected through a discharge resistor 121 to the ground connection 70. The resistor 121 will effect a discharge of the capacitor 125 after firing of the same. Unijunction transistor will fire or conduct a pulse of voltage whenever the voltage across the electrodes or between the one input electrode 116 and ground reaches the level of voltage set at the potentiometer wiper 113 connected to the control electrode 112. This will occur when the charge on the capacitor 125 reaches this level. The input conductor for the unijunction transistor 120 is connected to a pair of charging circuits which includes two gate units 130, 135 of a flip-flop circuit or switching configuration the outputs of which are connected through diodes 136, 137, respectively and resistors 138, 139, respectively and the resistors being connected in common and to the charging conductor 120. The gate units 130, 135 are part of a Quad 2-Input "nand" gate unit identified as type number MC672 or an integrated circuit package manufactured by Motorola Semiconductor Products, Inc., 5005 E. McDowell Road, Phoenix, Arizona 85008. These gate units are connected herein in such a manner as to provide two inverter units and two transistor amplifier units connected in a flip-flop circuit configuration. Thus the output of the unijunction transistor or the electrode 117 is connected through a conductor 119 to the input side 141 of an inverter unit 140 or one of the two input gates in which only a single input connection is utilized. The output of this gate as evidenced by the conductor 142 is connected through the coupling condensers 143, 144, respectively to one side of the respective gate units 130, 135 as indicated by the input conductors 131, 132. The opposite input conductors or connectors 133, 134 of the respective gate units 130, 135 are connected to the outputs 145, 146 of the gate units 130, 135 with the outputs being connected to an input conductor of the opposite gate unit in the flip-flop circuit in a conventional manner. Suitable feedback resistors 160, 161, respectively are connected between the output and the first of the input conductors of the respective gate units 130, 135 to complete the flip-flop circuit configuration. One of the flip-flop units and in particular the flip-flop unit 130 has its output terminal connected through a conductor 165 to the input terminal 162 of the other converter unit or "nand" gate 166 of the quad unit with the output terminal 163 of the same being connected to the base electrode 99 of the switching transistor 95. As in the case of the input converter, the second input electrode for this "nand" unit is not connected in any circuit. The four gate units 130, 135, 140 and 166, of the integrated circuit package are so connected internally in common that a common bus runs therebetween and a single supply or power conductor, such as is indicated at 168, connected to the regulated voltage conductor 90 is shown as connected to one of the gate units to energize all of the units. Similarly, a common ground connection, such as is indicated by the conductor 167, leading to the ground 70 will complete the energization circuits from the regulated power supply.

In the operation of the timer portion of the circuit, the inverter units at the input and output side of the flip-flop units will be conducting whenever no input is impressed on the input side of the same. The input thereto from the unijunction transistor will be such that no signal will be provided at the output side of the same while the capacitor 125 is charging and until such a time as the charged voltage level on the same and across the electrodes of the unijunction transistor reaches the voltage set at the wiper 113 of the potentiometer 114 or the control electrode of the unijunction transistor. At this point the unijunction transistor will fire and the capacitor will discharge through the resistor 121 providing a pulsed input current to the inverter unit 140. The flip-flop circuits will work in a conventional manner firing alternately to connect one or the other of the charging circuits formed respectively by diodes 136 and resistor units 138 or diode 137 and resistor unit 139 to the input side of the capacitor 125. This will change the level of the charging current from the output of the respective flip-flop units, whichever is operating, to vary the length of time in which it takes to bring the charge on the capacitor 125 to the control electrode level causing a subsequent firing. With each firing, the inverter unit will energize the opposite gate unit of the flip-flop than that which has been previously conducting causing that which has previously been conducting to turn off and the opposite unit to turn on switching to the other charging circuit common with the flip-flop unit then fired. Thus the integrated circuit package will provide a flip-flop circuit which alternates between charging circuits for the capacitor 125 and depending upon the charging circuit involved, a different time level will be required to bring the capacitor to a voltage level at which the unijunction will fire again. In the case of the circuit involved, whenever the gate unit 130 is fired, the inverter 166 will be energized terminating its output such that an output signal will be applied to the switching transistor 95 whenever the inverter 166 has no input signal applied across the same. This will be at a time when the gate unit 135 is conducting. The switching action is such as to turn on or off the switch of the switching package 80 formed by transistors 100, 101 connecting the diode sides or extremities of the secondary winding 62 to the center tap winding or ground 70. This will provide an energizing signal to the electromagnets 45 of the milker units causing the valves to open and vacuum to be applied to the diaphragms of the teat cups. The solid state conductor provides for continuous operation or running of the timing circuit and switching operation of the switching unit which is on a predetermined period of time and off a predetermined period of time depending upon the size of the resistors 138 or 139 of the charging circuits.

Figure 4:
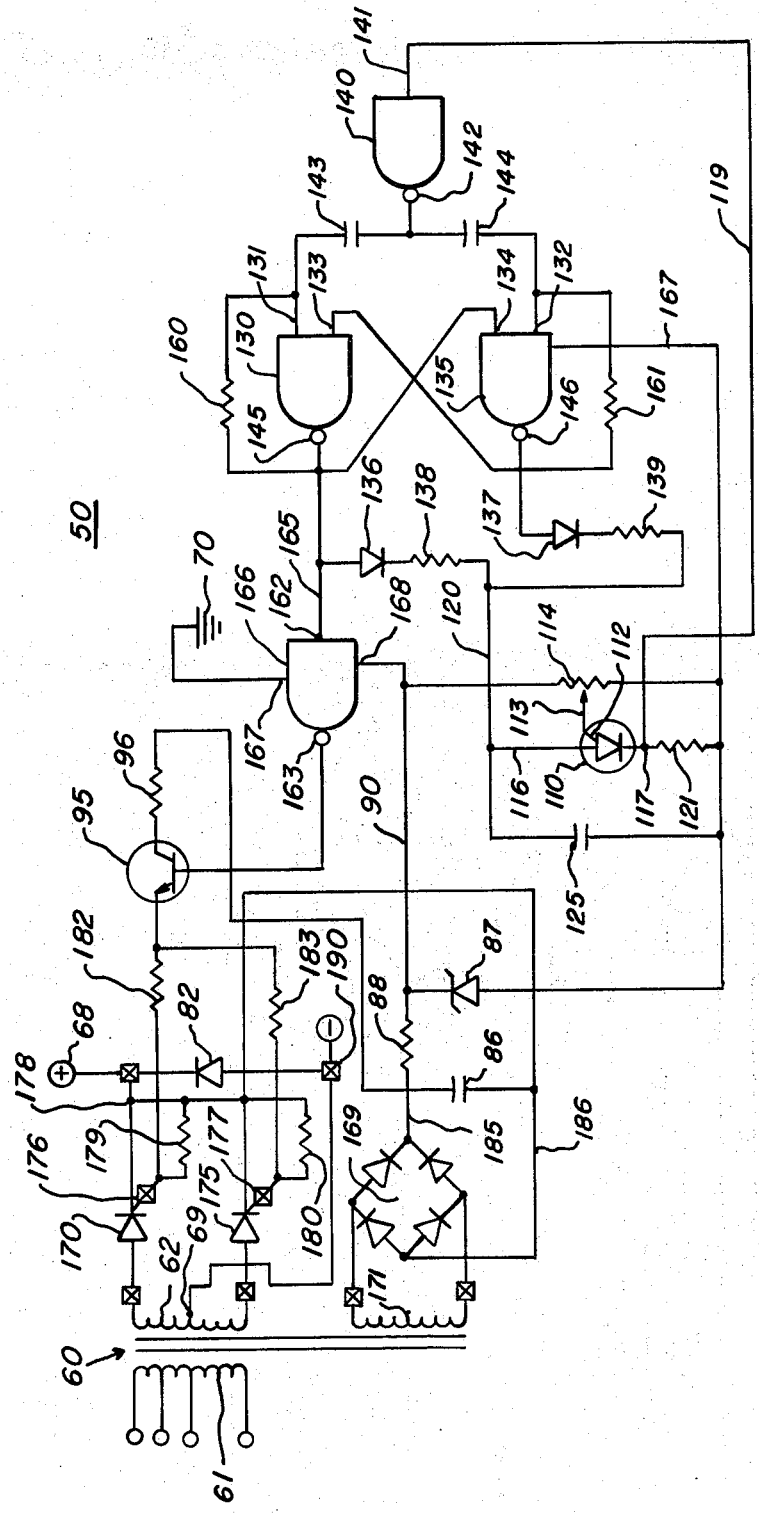
FIG. 4 is a schematic circuit of another embodiment of the control for our improved milking apparatus.

Another embodiment of the pulsator control is shown in FIG. 4 in which the silicon control rectifiers provide the diode action from the secondary winding 62 of the energizing transformer 60 to control the energization of the electromagnets 45. Where components in this circuit are identical with the embodiment shown in FIG. 3, they are numbered identical therewith and this includes basically the switching and control portions of the circuit. Thus the primary winding 61 of the transformer 60 is adapted to be connected to the alternating current source of power with the secondary winding 62 having its extremities connected to one of the power electrodes of a pair of SCRs or silicon control rectifiers 170, 175 with the opposite power electrodes of the respective rectifiers being connected in common and to a conductor 178 leading to the plus side 68 of the energizing circuit for the electromagnets. The center tap 69 of the secondary winding 62 is connected to a common voltage conductor 190 or the opposite side of the energizing bus for the electromagnets. The respective silicon control rectifiers include gate electrodes 176, 177 which are connected through bias resistors 182, 183, respectively and in common to the emitter electrode of the switching transistor 95. The diode 82 is connected between the common conductor 190 and the B+ conductor 68 for the electromagnet energizing circuit or across the electromagnets to prevent the inductive reaction of the electromagnets from affecting the switching operation of the circuit. Similarly, resistors 179, 180, respectively are connected to the gate electrodes 176, 177 of the rectifiers 170, 175 and in common at their opposite extremity to the common conductor 178 leading to the B+ supply. The transformer 60 includes a second secondary winding 171 the extremities of which are connected across the input diagonals of a full wave rectifier, indicated in block at 169. The output terminals of the full wave rectifier are connected through conductors 185, 186 to the RC network. The latter is comprised of a capacitor 86 connected across the output diagonals of the rectifier 169 and a resistor 88 connected to one side of the Zener diode 87 whose opposite extremity is connected to the opposite side of the capacitor 86 and the common conductor 178 of the rectifiers 170, 175. The regulated voltage supply is taken from the conductor 90 at the common point between the resistor 88 and the Zener diode 87 to energize the control electrode 112 of the unijunction transistor 110 through the potentiometer 114. This regulated supply is also connected to one side of the integrated circuit formed by the four "nand" gates 130, 135, 140 and 166 which is shown in FIG. 4 as terminal 168 associated with gate 166 with the circuit completed to ground 70 at terminal 167. As in the preferred embodiment, the integrated circuit is formed by two inverter units 140, 166 forming the input and output of the flip-flop circuit which is comprised of the gate units 130, 135 connected in a flip-flop circuit in the conventional manner. The input and output inverters 140 and 166 have single inputs thereto as evidenced by the conductors 141 and 162 with the output of the inverter unit 166 being connected to the base electrode of the switching transistor 95 controlling the application voltage to the gate electrodes 176, 177 of the SCRs or rectifiers 170, 175. The collector electrode of the switching transistor 95 is connected through resistor 96 to the unregulated side of the full wave rectifier 169. In series with the circuits with the outputs of each of the flip-flop gates 130, 135 are the respective charging circuits formed by diode 136 and resistor 138 or diode 137 and resistor 139, which circuits are connected in common with conductor 120 leading to the capacitor 125 impressing a voltage across the electrodes of the unijunction transistor 110. A discharge resistor 121 is connected in series of one of the electrodes and to the common conductor leading to one side of the full wave rectifier 169 and the common side of the bias resistors 179 and 180 of the gate electrodes of the rectifier units 170, 175.

In the operation of the timer portion of the alternate embodiment, the same switching function between the components of the flip-flop circuit takes place selectively connecting one or the other of the charging circuits to the capacitor 125 and the length of time to create a charge on the capacitor equal to the voltage at the control electrode 112 of the unijunction transistor will control the time of firing of the unijunction transistor. The pulsed output of the unijunction transistor will cause the inverter unit 140 to selectively switch to the opposite gate of the flip-flop combination connecting the other of the charging circuits for the next sequence of timing. One of the outputs of the flip-flops, as indicated by the gate unit 130, in this embodiment controls the operation of the inverter unit 166 to energize the switching transistor 95 controlling the energization of the gate electrodes of the silicon control rectifiers. The rectifiers extinguish with each alternating half cycle so that the application of power to the plus electrode 68 or the common bus for the electromagnets will be in a timed sequence with the energization of the electromagnets being timed during the on and off period cyclically and continuously in the operation of the pulsator.

The modification of the circuit for the automatic milking apparatus shown in FIG. 5 adds to the control circuit for the pulsator an automatic electronic circuit breaker. It is shown herein in conjunction with the circuit disclosed in FIG. 3 and only that portion of the circuit which is affected by the addition of the circuit breaker is disclosed in FIG. 5, it being understood that the remaining portion of the circuit will be unaltered from that shown in FIG. 3. Thus, the step down transformer 60 has a secondary winding 62 connected at its extremities through diodes 65, 66, respectively, with the opposite sides of the diodes being connected in common as at 67 through a common conductor leading to the voltage terminal 68 adapted to be connected to the electromagnet coil 45 or the bus conductor for the same. The center tap 69 on the secondary winding is connected to ground 70 with the electronic switch formed by transistors 100, 101 being positioned between the ground connection and the minus terminal 81 leading to the other side of the electromagnet coil. The diode 82 is connected between the terminals 68 and 81 to counteract the inductive reaction generated in the coils when the energization was removed therefrom. The control signal to the base of the transistor 100 is supplied through the control conductor 98 leading from the emitter of the switching transistor 95 and the collectors of the transistors 100, 101 are again connected in common and to the voltage terminal 81 of the electromagnets. The emitter of transistor 100 is connected to the base of the transistor 101 and the resistors 103 and 104 are connected in a base to emitter configuration for each of the transistors. The automatic electronic circuit breaker is formed by a silicon control rectifier 190 having one power electrode connected to the control conductor 98 and the other power electrode connected to the ground conductor which grounds the center tap 67 of the secondary winding. The gate electrode 192 of the silicon control rectifier is connected through a conductor 193 to conductor 105 leading to the emitter of transistor 101 and a resistor 194 is positioned between the conductor 105 and the ground connection 70. Thus, the gate electrode 192 of the silicon control rectifier will have impressed thereon the voltage drop across the resistor 194. This resistor produces a voltage proportional to the output current of the secondary winding through the diodes to the electromagnet inasmuch as it is in series circuit therewith. If the output current from the rectifier to the electromagnets becomes high enough, the voltage drop across the resistor 194 will trigger the silicon control rectifier 190 which when it fires clamps the base voltage or drive from the switching transistor 95 to the electronic switch formed by transistors 100, 101. The output voltage thus is reduced to zero as long as the overcurrent condition exists. Whenever the overcurrent or short is removed in terms of the current flow through the electromagnets or the bus connecting the same to the pulsator circuit the pulsating circuit again resumes normal operation. The trigger action of the silicon control rectifier is such that once an overcurrent condition is detected in the current flow through the electromagnet coils 45, the SCR 190 latches for the rest of the switching pulse. The latter is supplied from the switching transistor 95 through the timing portion of the circuit which is omitted in FIG. 5 but will be the same as in FIGS. 3 and 4. During the off pulse or off time the SCR will recover, that is become nonducting, so that on the next pulsation it can check for a continuation of the overcurrent condition. If none exists normal operation of the pulsating circuit resumes. Thus, the operation of the modified circuit is identical as far as the timing function with the before-mentioned embodiments of FIGS. 3 and 4 and the automatic circuit breaker may be equally applied to the disclosure of FIG. 4. The circuit breaker formed by the combination of the silicon control rectifier 190 and resistor will become operative only under an overcurrent condition when voltage drop across the resistor 194 indicates an overcurrent flow to the electromagnet coils. At this point, it will be effective only to alter the on time as dictated by the switching transistor 95 and electronic switch formed by transistors 100, 101 to terminate current flow until the next pulse or control. The timing portion of the circuit remains functioning in the normal manner as previously described and the function of the circuit breaker is such that it will reset itself if the overcurrent condition is eliminated on the next pulse. However, if the overcurrent condition exists, the same operation of the circuit breaker will be repeated until such time as the overcurrent condition is eliminated. Thus, the automatic electric circuit breaker provides an additional safeguard to the external circuit without altering the timing function or pulsating control in its normal operation.

With the operation of the pulsator, the electromagnets are selectively energized to operate the control valves connected to the vacuum lines of the milking units so that a conventional milking action may take place therein through the operation of a solid state control which requires no moving parts and is relatively maintenance free.

In considering this invention it should be remembered that the present disclosure is illustrative only and the scope of the invention should be determined by the appended claims.

What is claimed is:

1. An automatic milking apparatus having a plurality of milking units each having a reservoir connected to a milk line with a plurality of teat cups connected to the reservoir and with the teat cups each having a separate operating chamber connected to a vacuum line, a source of vacuum pressure and a plurality of valve means selectively controlling the application of vacuum pressure and atmospheric pressure to the operating chambers of the teat cups of the respective milking units and operated in the controlled sequence of operation, an electromagnet associated with each of said valve means for operating the same, the improvement residing in, a solid state control circuit for controllably energizing said electromagnets in a timed sequence in which a low voltage direct current is applied to the respective electromagnets for a predetermined length of time causing operation of the associated valve means to an open position and a de-energization of the electromagnets for a predetermined period of time followed by a continuous sequence of energization and de-energization of said electromagnets in said timed sequences, said circuit including an alternating current source of power, a rectifier means for converting the alternating current source of power to a direct current voltage to be applied to the electromagnets to energize the same, means for selectively applying the converted DC voltage to said electromagnets and removing the same, a capacitor, first and second charging circuits for said capacitor having different charging rates, switching means for sequentially switching between said charging circuits when the charge on the capacitor reaches a predetermined level and for discharging said capacitor with said switching, and means connected to and responsive to current flow and the absence of current flow in one of the charging circuits for controlling the means selectively applying the converted DC voltage to said electromagnets to energize and de-energize said electromagnets selectively in said timed sequence.

2. The automatic milking apparatus of claim 1 in which the means connected to and responsive to one of the charging circuits is a transistor switching means which conducts in the presence of a charging voltage in said charging circuit and is nonconductive in the absence of the charging voltage in said charging circuit to couple said rectifier means to said electromagnets.

3. The automatic milking apparatus of claim 2 in which the switching means sequentially switching between the charging circuits includes a unijunction transistor responsive to the voltage on the capacitor to effect switching between said charging circuits.

4. The automatic milking apparatus of claim 3 in which the switching means further includes transistor means in a flip-flop circuit to alternately connect the charging circuits to said capacitor.

5. The automatic milking apparatus of claim 4 in which the rectifier means includes means for providing a regulated voltage to said charging circuits to enable uniformity in the charging rates of said charging circuits creating the voltage buildup on said capacitor.

6. The automatic milking apparatus of claim 5 in which the rectifier means includes silicon controlled rectifiers having gate electrodes energized by said transistor switching means connected to and responsive to the current flow in said one of said charging circuits.

7. The automatic milking apparatus of claim 5 in which the rectifier means includes a step down transformer connected between the alternating current power source and the electromagnets with diodes being connected at the extremities of the secondary windings and with a center tap of the secondary winding being connected through said transistor means to complete the energization circuit between the diodes which are connected in common and to one end of said electromagnets and the center tap of the secondary winding which is connected through the transistor means to the other end of the electromagnets.

8. The automatic milking apparatus of claim 5 in which said rectifier means includes a step down voltage transformer connected to the alternating current source and having a plurality of taps on the primary winding side thereof to permit selective connection of the taps to varying input voltage levels of an alternating current power source.

9. The automatic milking apparatus of claim 5 in which the unijunction transistor includes a control electrode connected to a regulated source of direct current voltage with the remaining electrodes being connected selectively across the first and second charging circuits.

10. The automatic milking apparatus of claim 1 and including current responsive switching means responsive to the current flow from said rectifier means to said electromagnets and connected to said means selectively applying the converted DC voltage to said electromagnets for overriding the control of the means responsive to the current in one of the charging circuits and de-energizing the electromagnets when current flow thereto exceeds a predetermined value.

11. The automatic milking apparatus of claim 10 in which said current responsive means automatically restores control to the means responsive to the current flow in one of the charging circuits when the current flow to the electromagnet drops below said predetermined value.

12. The automatic milking apparatus of claim 7 and including automatic electronic circuit breaker means positioned between a portion of said transistor means and the center tap of the secondary winding and including means responsive to current flow through said portion of said transistor means indicative of current flow through the electromagnets to effect disconnection between said portion of said transistor means and said center tap of the secondary winding to isolate the energization circuit between the diodes and the electromagnets.

* * * * *